Figure 1:
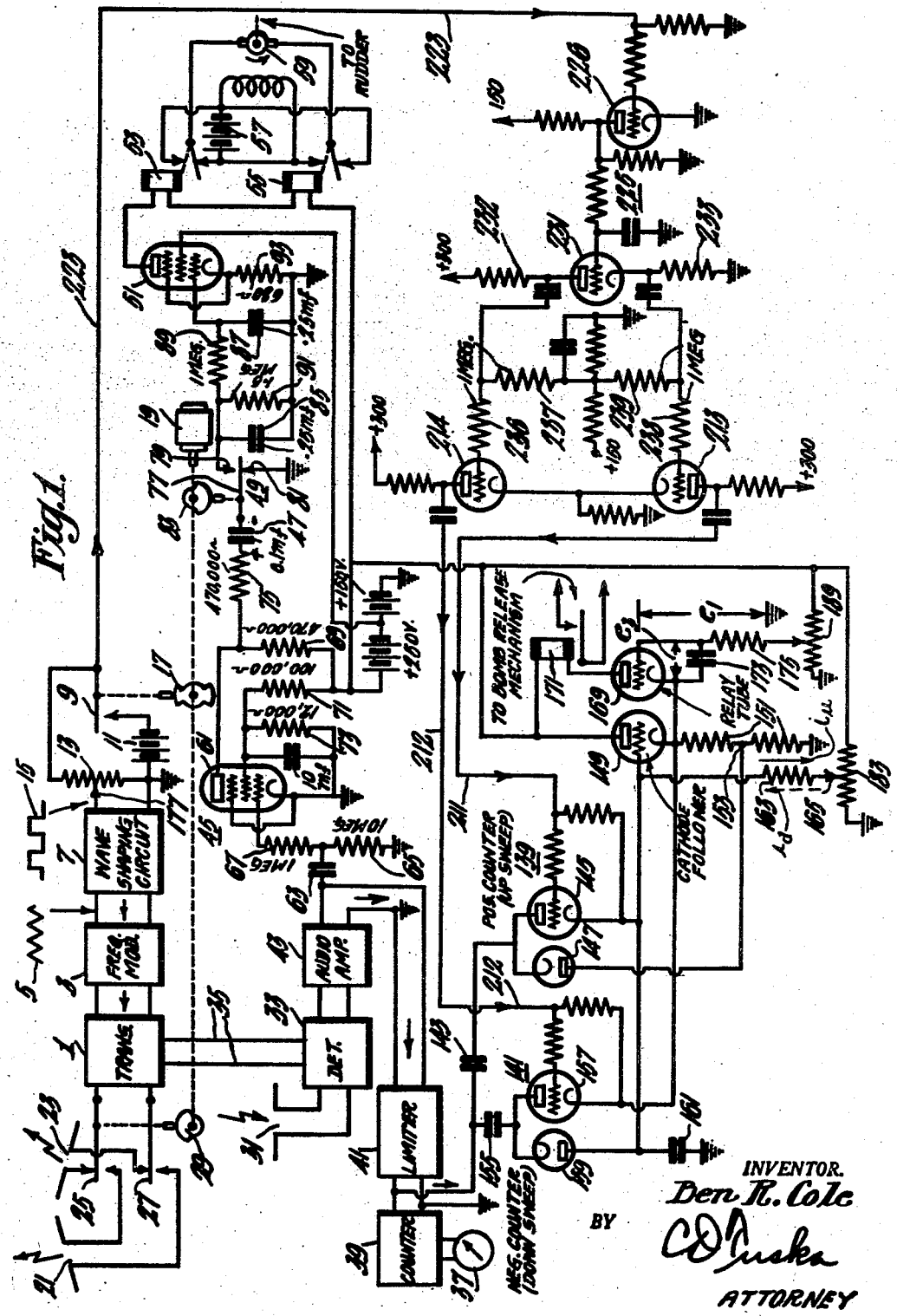

Nov. 23, 1948.　　　　　B. R. COLE　　　　2,454,633
FREQUENCY MODULATED RADAR APPARATUS
Filed Nov. 10, 1945　　　　　　　　　　3 Sheets—Sheet 3
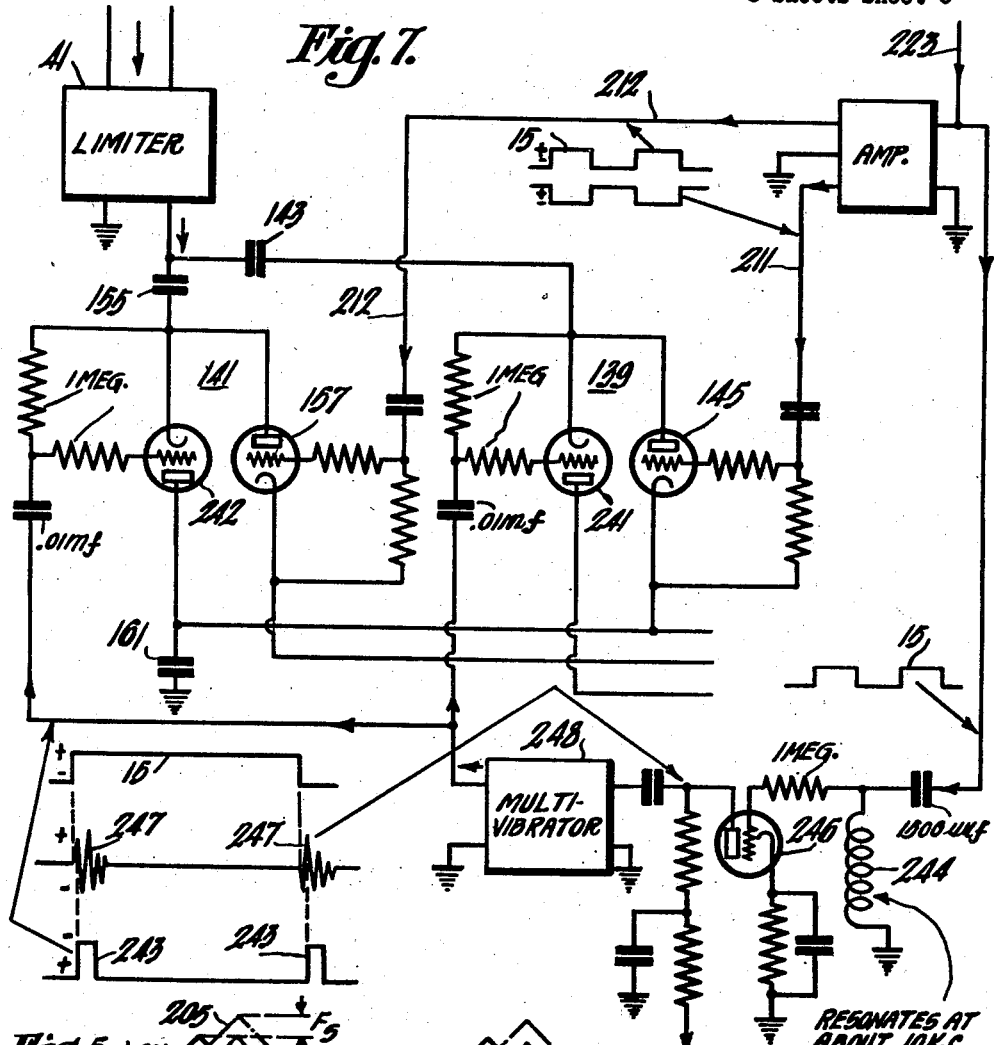
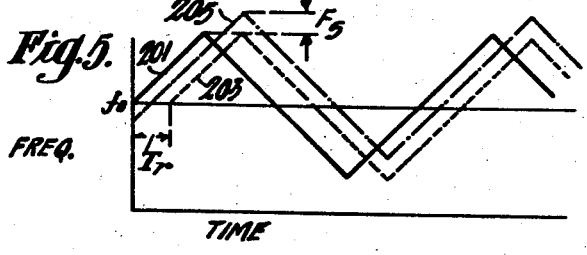
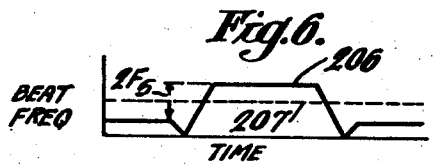
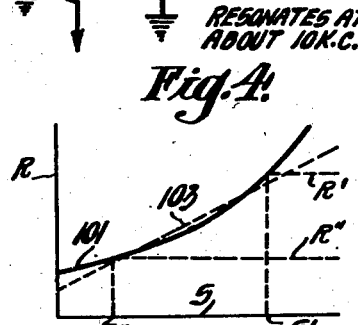
INVENTOR.
Ben R. Cole
BY
C D Tuska
ATTORNEY Patented Nov. 23, 1948

2,454,633

UNITED STATES PATENT OFFICE 2,454,633

FREQUENCY MODULATED RADAR APPARATUS

Ben R. Cole, Princeton, N. J., assignor to Radio Corporation of America, a corporation of Delaware Application November 10, 1945, Serial No. 627,949

5 Claims. (Cl. 343—8)

My invention relates to radio control apparatus and particularly to radar apparatus of the frequency modulated type. The invention will be described specifically as applied to apparatus that is designed to direct airborne devices toward an enemy target and to release bombs at the proper time for hitting the target.

In one system to which the present invention is applied, radio signals are radiated alternately in two overlapping directive patterns, and the amplitude of the signals reflected from the target with one radiation pattern is compared with that of the signal reflected from the target with the other radiation pattern. The alternate radiation of the two patterns is accomplished by switching the transmitter first to one antenna and then to a second antenna. If the amplitudes of the two signals are equal, the reflecting target lies on the equi-signal line of intersection of the alternate radiation lobes. If the amplitudes are unequal, the target lies in the lobe from which the greater signal is reflected. In order to provide response to an inequality in amplitude of the reflected signals, a circuit capable of comparing the amplitudes of the signals received during successive periods of radiation in alternate directive patterns is employed. In copending application Serial No. 534,114, filed by William R. Mercer on May 4, 1944, now Patent No. 2,433,287, which issued December 23, 1947, and entitled Comparator circuits, a circuit for this purpose is described and claimed.

The above-mentioned antenna switching produces transient signals which, while they do not interfere with the comparator circuit operation, do interfere with proper operation of the bomb release circuit with the result that the bomb may not be released at the proper time. A bomb release circuit of the type referred to is described and claimed in copending application Serial No. 605,412, filed by Royden C. Sanders, Jr., and Daniel Blitz on July 16, 1945, and entitled Radio devices.

An object of the present invention is to provide an improved method of and means for reducing or eliminating the effects of antenna switching transients or the like in a radio bomb release circuit.

A further object of the invention is to provide an improved method of and means for reducing or eliminating transient effects in an automatic bomb release circuit of the frequency modulated radar type that utilizes the Doppler effect.

A further object of the invention is to provide an improved radio system for directing an airborne device toward a target and for automatically dropping bombs thereon.

A still further object of the invention is to provide an improved method of and means for reducing or eliminating undesired effects in a frequency-modulated altimeter or radar system which occur during the interval between increasing frequency and decreasing frequency of the frequency modulated radio wave.

It might be expected that the objects of the present invention could be accomplished by blocking the radio receiver or an amplifier therein during the occurrence of the switching transients or other undesired effects. This was found to be ineffective because such blocking introduced other transients. According to the present invention, the frequency counter circuit or circuits are rendered inactive during the occurrence of the undesired effects. It has been found that any difficulty previously caused by switching transients, for example, may be substantially eliminated in this way.

Figure 2:
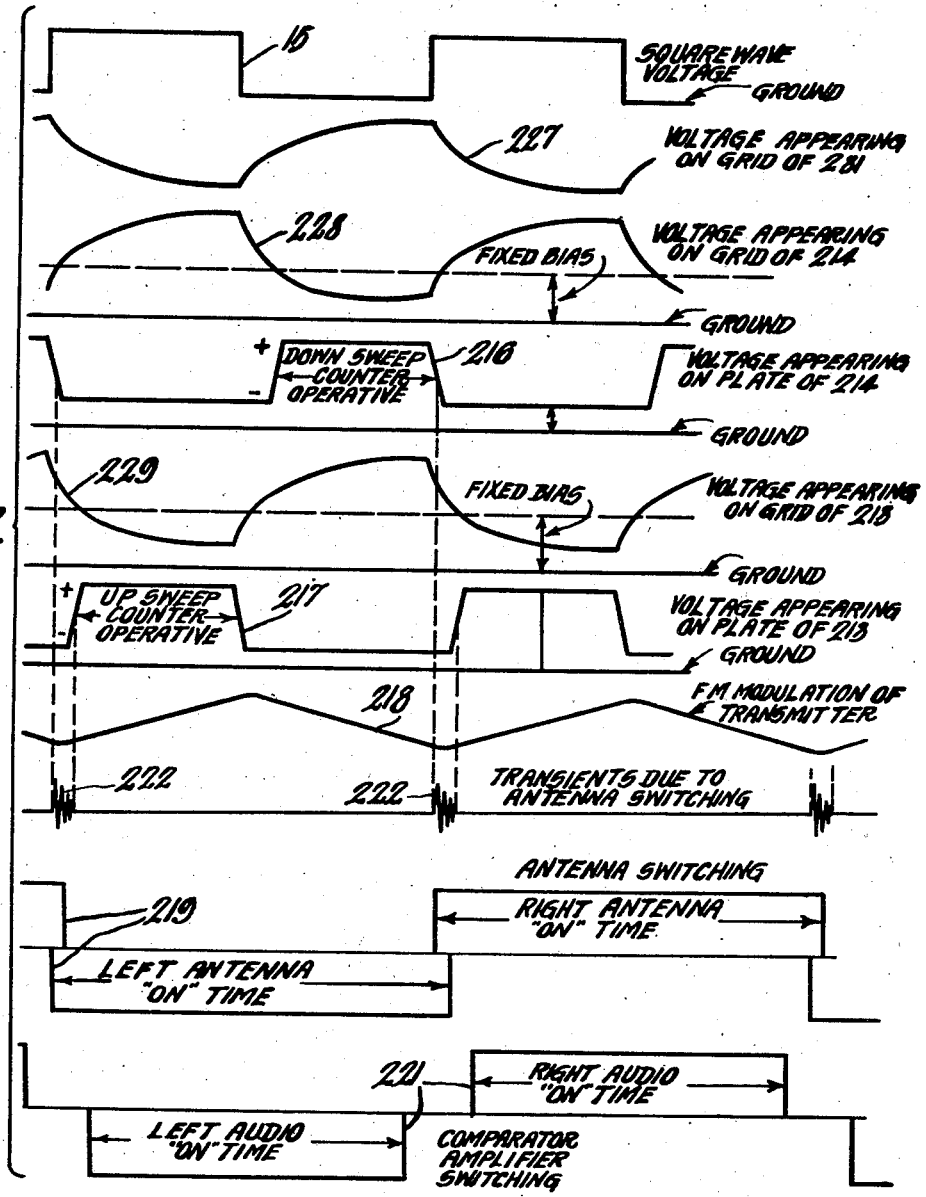
Figure 3:
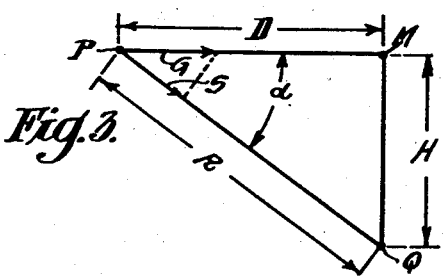

The invention will be better understood from the following description taken in connection with the accompanying drawing in which Figure 1 is a block and circuit diagram of a system embodying the invention, Figure 2 is a group of graphs that are referred to in explaining the invention, Figure 3 is a diagram showing the geometry of a bomb release problem, Figure 4 is a graph showing the relationship of slant range to slant speed for bomb release at a particular altitude, and the linear approximation to said relationship, Figure 5 is a graph illustrating the variations in frequency of the signals transmitted and received in the operation of the bomb release portion of the system of Figure 1, Figure 6 is a graph illustrating the variations in frequency of the beat signal produced in the operation of the bomb release portion of the system of Figure 1, and Figure 7 is a circuit diagram illustrating another embodiment of the invention.

In the several figures, similar parts and graphs are indicated by similar reference characters.

Before describing a specific method or circuit for practicing the invention, the portions of the radar control system as described in the above-mentioned copending applications will be described.

Comparator circuit

Referring to Fig. 1, there is shown a frequency modulated radio control system comprising a radio transmitter 1 which is cyclically frequency modulated by a frequency modulator 3, such as a variable capacitor unit, in response to a modulated signal 5 applied thereto from a wave shaping circuit 7. In the example illustrated, the modulating signal 5 is of triangular wave shape.

The triangular wave 5 is produced by periodically opening and closing a switch 9 in series with a battery 11 and a voltage divider 13. This generates a voltage 15 of square wave form that is applied to the wave shaping circuit 7 to obtain the voltage 5 of triangular wave form. In this case the wave shaping circuit 7 may be merely an integrating circuit. The switch 9 is operated by a cam 17 driven by a motor 19.

The output of the transmitter 1 is radiated alternately from a pair of directive antennas 21 and 23. This is accomplished by means of a switch comprising switch arms 25 and 27 connected together mechanically for operation by means of a cam 29. The cam 29 is connected to the motor 19. After reflection from a target, the frequency modulated signals are received by a directive antenna 31 and applied to a beat frequency detector 33. The frequency modulated signals are also supplied to the detector 33 over a line 35 directly from the transmitter 1, whereby the frequency of the beat output of the detector 33 is proportional to the distance to the target. This distance may be indicated by a meter 37 connected to the output circuit of a frequency counter 39, which is connected to the output of the detector 33 through a limiter 41.

For obtaining directional information, output signal from the detector 33 is applied to an audio amplifier 43 connected to an amplitude comparator circuit comprising a rectifier 45, a storage capacitor 47 and synchronous switch 49, and a relay amplifier 51. The output circuit of the amplifier 51 includes a pair of relays 53 and 55, each provided with a single-pole double-throw contact arrangements for connecting a battery 57 to a motor 59.

The rectifier 45 comprises a grid leak type detector circuit including an electron discharge tube 61 provided with a grid capacitor 63, grid leak resistor 65, grid current limiting resistor 67, and a load resistor 69. In the illustrated circuit, the tube 61 is of the pentode type, with screen potential provided by a voltage divider including resistors 71 and 73 connected across the anode supply voltage.

The anode of the tube 61 is connected through a resistor 75 to one terminal of the capacitor 47. The other terminal of the capacitor 47 is connected to the moving contact 77 of the switch 49, which includes two fixed contacts 79 and 81. The contact 77 is operated by means of a cam 83 connected to the motor 19, in synchronism with the switches 25 and 27. The contact 81 is connected to ground. The contact 79 is connected to the amplifier 51 through a low pass filter circuit comprising capacitors 85 and 87 and a resistor 89. A resistor 91 is connected across the capacitor 85, and together with the resistor 89 constitutes a grid leak for the amplifier 51.

The relays 53 and 55 are adjusted so that the drop out current of relay 53 exceeds the pick-up current of relay 55 by a small amount. For example, the relay 53 may be adjusted to pick up with a current of 4.6 milliamperes and drop out at 4 milliamperes, while the relay 55 is adjusted to pick up at 2.6 milliamperes and drop out at 2 milliamperes. Thus when the output current of the amplifier 51 is less than 2 milliamperes, both relay armatures are in their lower positions as indicated in solid lines in the drawing. When the current is between 2.6 milliamperes and 4 milliamperes, the armature of the relay 55 will be in its upper position as indicated in dash line, while the armature of the relay 53 will remain in its lower position. When the current is greater than 4.6 milliamperes, the armatures of both relays will be in their upper (dash line) positions. Thus when the output current of the amplifier 51 has a value within the range of 2.6 to 4 milliamperes, the armature of the motor 59 is disconnected from the battery 57 and short-circuited. When the output current is above this range, the motor 59 is connected to run in one direction, and when the current is below 2 milliamperes, the motor is connected to run in the opposite direction. The motor 59 may be mechanically connected to the rudder or other steering mechanism (not shown) of a mobile craft carrying the equipment.

In the operation of the above described system, the motor 19 drives the cam 17 to modulate the transmitter 1, and the cams 29 and 83, to switch the antennas and the comparator circut. The cam 17 includes two lobes, while the cams 29 and 83 each include one lobe. The purpose of this arrangement is to provide a complete frequency modulation cycle during each period of transmission on each of the antennas 21 and 23. The amplitude of the beat output of the detector 33 depends upon the strength of the reflected signal. Hence, if the reflecting target is on the equi-signal line of the directive patterns of the antennas 21 and 23, the beat output will not vary in amplitude with the operation of the switches 25, 27 and 49. However, if the target is to the left of the equi-signal line, a stronger signal will be received during the time that the antenna 21 is being used for transmission and weaker during the time that the antenna 23 is used, causing the beat output of the detector 33 to have a substantially square wave amplitude envelope. The phase of this envelop with respect to the switching cycle is constant. Similarly, if the target is to the right of the equi-signal line, a similar square wave envelope will be produced but of opposite phase.

The rectifier tube 61 is biased by its own grid current. Thus when the amplitude of the output of the amplifier 43 is low, the average anode current of the tube 61 is high, and vice versa. Inasmuch as the anode current through the tube 61 is necessarily unidirectional, the output voltage appearing across the load resistor 69 is unidirectional, following the envelope of the output of the amplifier 43, but in opposite phase. During the time that the antenna 23 is connected to the transmitter 1, the capacitor 47 is connected to ground through switch 49. The capacitor 47 is thus charged to a voltage depending upon the strength of the reflected signal, in the polarity indicated by the signs + and —. The value of the resistor 75 is selected with respect to that of the capacitor 47 to provide charging to a value between the peak value and the average value of the voltage across the load resistor 69. When the antenna 21 is connected to the transmitter 1, the capacitor 47 is connected to the input circuit of the amplifier 51. The voltage drop at this time across the load resistor 69 depends upon the strength of the signal reflected from the target in response to transmission of the antenna 21.

The voltage at the upper end of the resistor 69 is positive with respect to ground. Thus the voltage applied to the input circuit of the amplifier 51 is the difference between that at the upper end of the resistor 69 and that to which the capacitor 47 is charged. If the reflected signal is larger from the antenna 23 than the antenna 21, the average voltage applied to the amplifier 51 will be positive, since the capacitor 47 will be charged to a lower voltage than the voltage existing at the anode of the tube 61 while the antenna 21 is connected. Similarly, the voltage at the input of the amplifier 51 will be negative if the reflected signal from the antenna 23 is larger than that from the antenna 21. When the reflected signals are equal, the input voltage to the amplifier 51 is zero. The amplifier 51 is biased by means of a cathode resistor 93 to provide an anode current of approximately three milliamperes, when the input signal is zero. Thus when the target is off to the left of the equi-signal line, the anode current is decreased and the armatures of the relays 53 and 55 fall to their lower positions connecting the motor 59 for rotation in one direction, for example, clockwise. When the target is off to the right of the equi-signal line, the motor 59 is similarly energized to rotate counter-clockwise.

In the described embodiment of the invention, the transmitting antennas are alternately energized to provide overlapping radiation lobes, and the receiving antenna is directed along the equi-signal line. Although this arrangement is preferred at present, it will be apparent that a single transmitting antenna may be used, with switched receiving antennas, or both the transmitting and receiving antenna systems may be switched to provide overlapping directive patterns.

As a matter of practice, it is not possible to arrange the switches 25 and 27 to change the connections of the transmitter 1 instantaneously from one of the antennas to the other. The designer is confronted with the choice of having both antennas connected to the transmitter during the switching period, or having both antennas disconnected from the transmitter during the switching period. The former alternative is to be preferred, since the variation of the impedance presented to the transmitter by this method is only 2:1. A similar choice must be made with reference to the switch 49. In this case, the moving contact 77 must be disconnected from both of the stationary contacts during the switching period, rather than connected to both of them, since the capacitor 85 would otherwise be discharged during each operation of the switch, producing serious transient disturbances that would affect the comparator circuit operation. It should be noted that the lengths of the periods during which the switch 49 is closed in each of its two positions will affect only the sensitivity of the system, since the capacitor 47 will not be fully charged within the time during which the contact 77 is connected to either side. However, since the average charging current must equal the average discharge, the calibration is independent of the relative durations of the connection periods. Thus, no serious requirement is placed upon the switch 49 with regard to matching the lengths of the periods of alternate connection.

The relays 53 and 55 are adjusted to provide "dead space" in order to prevent spurious operation of the motor 59 as a result of noise variation in tube characteristic, etc. A single relay provided with equivalent arrangement may be substituted for the relays 53 and 55.

*Automatic bomb release circuit*

Refer to Figure 3. It is assumed that an aircraft at the point P is flying horizontally at a velocity G toward a point M, directly over a target at the point Q, at an altitude H. A bomb released at the altitude H without any vertical velocity will require a time $T_f$ to fall to the level of the target.

(1) $$T_f = \sqrt{\frac{2H}{g}}$$

where $g$ equals the acceleration caused by gravity, 32.2 feet/sec.$^2$, approximately.

In order for the bomb to strike at the point Q, it must be released $T_f$ seconds before the craft reaches the point M. The time T which must elapse before the craft reaches the point M is (2) $$T = \frac{D}{G}$$

If the horizontal speed G and the horizontal component G of the target range were known, the calculation of T would be a simple matter. The condition for release is:

$$T = T_f$$

or substituting (1) and (2), (3) $$\frac{D}{G} = \frac{2H}{g}$$

Radio reflection equipment does not measure the horizontal distance D, but the true or slant distance R. Similarly, the horizontal speed G is not measured directly, but its slant component S is measured. Accordingly, it is necessary to determine the time T in terms of these quantities. It is apparent from Figure 3 that at great distances or low altitudes from the target, the target depression angle α will be small, and the slant speed and slant range will be nearly the same as the horizontal speed and horizontal range. As the distance is decreased or the altitude increased, the differences between the slant and horizontal speeds and distances will increase.

Referring to Figure 4, the curve 101 shows the relation between slant speed S and slant range R which corresponds to one particular value of $T_1$, which in turn is the time of fall $T_f$ from an altitude $H_1$. Thus if a bomb is released from the altitude $H_1$, when R and S are of such values as to satisfy the relationship represented by the curve 101, the bomb will strike the target.

For every different altitude, there is a different relationship between R and S which must be satisfied for proper release. The curve 101 is thus but one of a family of similar curves. In the present system a linear approximation is used, rather than the actual R—S relationship. This approximation need be accurate only within the range S' to S'' of slant speeds which will occur in the practical operation of the system. The dash line 103 in Figure 4 is the linear approximation to the curve 101 which produces the smallest maximum error throughout the range of slant speeds from S'' to S'.

The equation of the line 103 is (4) $$R = mS + R_0$$

where $m$ is the slope of the line:

(5) $$m = \frac{R' - R''}{S' - S''}$$

and $R_0$ is the range intercept at zero speed, as indicated in Figure 4. As stated above, the relations shown in Figure 4 correspond to one specified altitude, $H_1$. For any other altitude, both $m$ and $R_0$ will have correspondingly different values. By setting in the values of $m$ and $R_0$ corresponding to the particular altitude H at which a craft is flying a substantially correct release may be obtained by satisfying the relationship of Equation (4).

Referring to Figure 1, the output circuit of the limiter 41 is connected to a pair of frequency responsive circuits comprising averaging cycle counters 139 and 141, respectively. The counter 139 includes a capacitor 143, connected from the limiter 41 to the anode of a triode 145 and to the cathode of a diode 147. The cathode of the triode 145 is connected to the control grid of an amplifier tube 149. The entire load resistance 151 associated with the tube 149 is connected in its cathode circuit so that it acts as a so-called "cathode follower." The anode of the diode 147 is connected to a tap 153 on the resistor 151.

The counter 141 includes a capacitor 155 connected from the limiter 41 to the anode of a triode 157 and to the cathode of a diode 159. The anode of the diode 159 is connected to the control grid of the cathode follower tube 149. The cathode of the triode 157 is connected to the upper end of the load resistor 151, at the cathode of the tube 149. The counters 139 and 141 are provided with a common storage capacitor 161, connected between the control grid of the tube 149 and ground. They also have a common load resistor 163, connected from the grid of the tube 149 to a point 165 on a voltage resistor 183.

The control grid of the counter triode 145 and the control grid of the counter triode 157 are coupled through leads 211 and 212, respectively, to the output circuits of a pair of amplifier tubes 213 and 214, respectively so that square wave voltages are applied thereto. These voltages are 180 degrees out of phase with respect to each other and are in synchronism with both the transmitter frequency modulation and the antenna switching as explained hereinafter. The connections are such that the triode 157 is cut off and the triode 145 is conductive while the frequency of the transmitter 1 is increasing, and the triode 145 is cut off and the triode 157 is conductive while the transmitted frequency is decreasing. As will be discussed under the heading "Switching transient elimination," the square wave counter switching voltages are given a time relation and duration such as to eliminate the effects of the switching transients.

The cathode of the cathode follower tube 149 is connected to the cathode of a relay amplifier tube 169. The anode circuit of the tube 169 includes the actuating coil of a relay 171. The contacts of the relay 171 are connected to the actuating circuit of a bomb release mechanism (not shown). The control grid of the relay tube 169 is by-passed to the cathode through a capacitor 173, and is connected through a resistor 175 to the adjustable contact of a voltage divider 189.

The adjustment and operation of the system thus far described is as follows:

Owing to the cyclical operation of the switch 9 by the motor 19, the frequency of the output of the transmitter 1 varies cyclically as shown by the solid line 201 of Figure 5. Some of this output is transferred directly to the receiver detector 33 through the line 35. The greater portion is radiated by the antennas 21 and 23. Some of the radiated energy strikes the selected target (not shown), and is reflected to the antenna 31. The time required for the transmitted energy to travel to the target and back to the antenna 31 is proportional to the slant range R from the aircraft to the target. The variations in frequency of the received energy are accordingly delayed with respect to those of the transmitted energy. The variation of frequency of the received signal as a function of time, assuming no relative motion between the aircraft and the target, is shown by the dot line 203. The delay $T_r$ is proportional to the range R.

Now if the range is decreasing at a rate S, the frequency of the received signal will be increased, owing to Doppler effect. Thus the frequency of the received signal will vary with time as shown by the dash line 205. The increase in frequency $F_s$ is directly proportional to the speed S.

The direct and reflected signals from the transmitter 1 are mixed and detected in the receiver detector 33. The output of the receiver comprises a beat frequency signal, which has a frequency equal to the difference in the frequencies of the two signals applied to the receiver. The frequency of this beat signal varies with time as shown by the solid line graph 206 of Figure 6. The mean value of the beat frequency, indicated by the dash line 207 in Figure 6, is directly proportional to the range R, and is equal to:

$$(6) \qquad \frac{f_m f_s R}{246}$$

where $f_m$ is the modulating frequency in cycles per second, $f_s$ is the sweep width, or range of variation of the transmitter frequency, in megacycles per second, and R is the slant range in feet. The beat frequency varies cyclically above and below its mean value by the amount $F_s$. During increase of transmitter frequency the beat frequency is:

$$(7) \qquad f_u = \frac{f_m f_s R}{246} - \frac{2 f_0 S}{c}$$

where $f_0$ is the mean transmitted frequency (see Figure 5) in cycles per second, S is the slant speed in feet per second, and c is the velocity of wave propagation (the velocity of light) in feet per second. During decrease of transmitter frequency the beat frequency is:

$$(8) \qquad f_d = \frac{f_m f_s R}{246} + \frac{2 f_0 S}{c}$$

As mentioned above, the triode 157 of the counter 141 is cut off during increase of transmitted frequency, and the triode 145 of the counter 139 is conductive. During this period, the counter 139 operates to provide an average current $i_u$ in the direction of the solid arrow through the load resistor 163. This current is:

$$(9) \qquad i_u = k_1 f_u = k_1 \left( \frac{f_m f_s R}{246} - \frac{2 f_0 S}{c} \right)$$

where $k_1$ is a constant directly proportional to the capacitance of the capacitor 143. The counter 141 does not operate.

During decrease of transmitted frequency, the triode 145 is cut off and the counter 139 does not operate. The triode 157 is conductive, and the counter 141 provides an average current $i_d$ in the direction of the dash arrow through the load resistor 163. This current is:

$$(10) \qquad i_d = k_2 f_d = k_2 \left( \frac{f_m f_s R}{246} + \frac{2 f_0 S}{c} \right)$$

where $k_2$ is a constant directly proportional to capacitance of the capacitor 155. The common load capacitor 161 averages the pulsations in the voltage at the control grid of the cathode follower tube 149, so that the voltage between the cathode follower grid and ground is:

$$(11) \quad e_0 + \frac{i_u - i_d}{2} R_L = e_0 + \frac{R_L}{2}\left[k_1\left(\frac{f_m f_s R}{246} - \frac{2f_0 S}{c}\right) - k_2\left(\frac{f_m f_s R}{246} + \frac{2f_0 S}{c}\right)\right]$$

where $e_0$ is the potential at the point 165 and $R_L$ is the resistance of the load resistor 163.

The cathode of the tube 149 is maintained at substantially the same potential as the control grid as long as the current through the resistor 151 is only the anode current of the tube 149. Thus the potential at the cathode of the relay tube 169 is the same as that at the grid of the tube 149. The potential at the control grid of the relay tube (referred to ground) is the voltage $e_1$ at the tap of the voltage divider 189. Thus the voltage $e_3$ between the cathode and the control grid of the relay tube is:

$$e_3 = e_0 + \frac{R_L}{2}\left[k_1\left(\frac{f_m f_s R}{246} - \frac{2f_0 S}{c}\right) - k_2\left(\frac{f_m f_s R}{246} + \frac{2f_0 S}{c}\right)\right] - e_1$$

Rearranging the terms, $$(12) \quad e_3 = e_0 - e_1 + R f_s (k_1 - k_2)\left(\frac{R_L}{2} \cdot \frac{f_m}{246}\right) - S(k_1 + k_2)\left(\frac{R_L}{2} \cdot \frac{2f_0}{c}\right)$$

The quantities $k_1$, $k_2$, $R_L$, $f_m$ and $f_0$ are all constants, determined in accordance with design considerations. Therefore Equation 12 can be written as:

$$(13) \quad e_3 = e_0 - e_1 + K_1 f_s R - K_2 S$$

where $$K_1 = (k_1 - k_2)\left(\frac{R_L}{2} \cdot \frac{f_m}{246}\right)$$

and $$K_2 = (k_1 + k_2)\left(\frac{R_L}{2} \cdot \frac{2f_0}{c}\right)$$

As long as $e_3$ is sufficiently large to bias the relay tube 169 to cutoff, no current flows through the relay 171 and it remains open. However, when $e_3$ becomes equal to $e'_3$, the voltage at which the tube 169 starts to conduct, the relay 171 is closed. At this time $$e'_3 = e_0 - e_1 + K_1 f_s R - K_2 S$$

The slant range is therefore:

$$(14) \quad R = \frac{K_2 S}{K_1 f_s} + \frac{e_0 - e_1 - e'_3}{K_1 f_s}$$

This may be expressed as Equation 4 above, $$R = mS + R_0$$

where $$(15) \quad m = \frac{K_2}{K_1 f_s}$$

and $$(16) \quad R_0 = \frac{e_0 - e_1 - e'_3}{K_1 f_s}$$

Thus by setting the values of $$\frac{K_2}{K_1 f_s} \text{ and } \frac{e_0 - e_1 - e'_3}{K_1 f_s}$$

in accordance with the altitude H, the relay can be made to operate at the proper release time, within the limits of the linear approximation of the corresponding R—S curve.

It is apparent from Equation 15 that $m$ is inversely proportional to the band width $f_s$. Accordingly, the proper value of $m$ for any particular altitude H may be obtained by adjustment of the sweep width control tap 177 on the resistor 13. $R_0$, as shown by Equation 16, is also inversely proportional to the band width, and is directly proportional to the voltage which must be present across the counter load resistor 163 to cause the relay tube 169 to conduct. This voltage is the difference between the total bias from cathode to grid of the relay tube 169, $(e_0 - e_1)$, and the cutoff bias $e'_3$, and is a function of the setting of the tap on the resistor 189 which controls the bias $e_1$ at the grid of the relay tube 169. Thus the tap on resistor 189 is employed to control $R_0$ in accordance with the altitude.

*Switching transient elimination*

In Fig. 1, the antenna switching transients are made ineffective in the bomb release circuit by properly shaping and timing the counter switching voltages as previously mentioned. The way in which this is done will be understood by referring to the graphs of Fig. 2 where the said counter switching voltages are represented by the graphs 216 and 217. The frequency modulation sweep cycle of the transmitter is represented by the graph 218. The antenna switching periods and the audio frequency amplifier switching periods are represented by the graphs 219 and 221, respectively.

The graph 222 shows the transients that are produced at the time the transmitter 1 is switched from one antenna to the other. Comparing the time relation of the transients 222 and the counter switching voltages 216 and 217, it will be seen that during the presence of each transient 222 there is no positive switching voltage on either counter. Therefore, each counter is inactive at the instant a transient could disturb the counter operation. As a result, the counter outputs are not affected by the switching transients and the accuracy of the bomb release is greatly improved.

Note is made of the fact that at the graph 218 the point of change from increasing frequency to decreasing frequency, or vice versa, which is referred to as the "turn-around point" is slightly delayed in time with respect to the back edge of the voltage wave 15. This delay naturally occurs where the triangular frequency modulation is obtained by use of a driven diaphragm type modulator as described in copending application Serial No. 512,153, filed November 29, 1943, in the name of Irving Wolff, and entitled Vibratory mechanical system, now Patent No. 2,445,014, which issued July 13, 1947.

Reference will now be made to the circuit and method for obtaining the counter switching voltages 216 and 217. Referring to Fig. 1, the square wave 15 (Figs. 1 and 2) is supplied from the switch 9 over a conductor 223 to an amplifier tube 226. The wave 15 is then passed through an integration circuit 225 whereby a voltage represented by the graph 227 (Fig. 2) appears on the grid of the tube 231. Voltage waves 228 and 229 of opposite polarities are supplied from the plate and cathode resistors 232 and 233 of the tube 231 to the grids of the amplifier tubes 214 and 213, respectively.

The grids of the tubes 214 and 213 have positive voltage biases applied to them through the one megohm resistors 236 and 237 and through the one megohm resistors 238 and 239, respectively. Hence, in the absence of signal the grids of tubes 214 and 213 are maintained at substantially zero bias. When the integrated waves 228 and 229 are applied to these grids, the plate current of the tubes 214 and 213 does not change until the grids go sufficiently negative to equal the applied fixed positive voltage at which time the plate currents decrease until the grids have been driven to cutoff and no further change in plate current takes place. This results in the counter switching waves 216 and 217 (Fig. 2) at the plates of the tubes 214 and 213, respectively. As previously stated, the counter switching waves 216 and 217 are supplied over the leads 212 and 211, respectively, to the counters 141 and 139, respectively.

As indicated in Fig. 2, the counters 141 and 139 function only during the occurrence of the positive portions of the switching voltages. A comparison of the switching voltage graphs 216 and 217 with the switching transient graph 222 shows that during the interval that a switching transient occurs, neither switching voltage is sufficiently positive to operate a counter. Therefore, both counters are inactive during this interval with the result that the output of the two counters is not affected by the switching transient.

Fig. 7 shows an embodiment of the invention wherein the counter diodes 147 and 159 of Fig. 1 are replaced by triodes 241 and 242, respectively, which have negative blanking pulses 243 applied to their grids. The blanking pulses render the counters 139 and 141 inactive for the duration of the pulses, the duration of each blanking pulse being made to coincide with the duration of the switching transients.

The counter blanking pulses 243 may be produced in various ways. In the example illustrated, the square wave 15 is applied to an inductance coil 244 in the grid circuit of a vacuum tube 246. The coil 244 because of its distributed capacity resonates at some suitable frequency, such as one from 10 kilocycles per second (10 kc.) to 15 kc., for example, when it is shock excited by either the front edge or the back edge of the square wave 15. The resulting short trains of damped waves are reversed in polarity by the tube 246 and appear as shown at 247 at the input of a multivibrator 248. The multivibrator 248 may be of the well known unsymmetrical type which is biased so it is not self-oscillatory and which is adjusted to produce a narrow negative pulse in response to being triggered by a positive half cycle of a wave train 247.

It should be understood that the invention is not limited to the feature of blanking a frequency counter in a frequency-modulated radar system for the purpose specifically described in the foregoing pages. For example, in some systems the antenna switching and amplitude comparator feature may be omitted and only the automatic bomb release apparatus employed. In that case there are, of course, no switching transients, but the use of the counter blanking during the "turn-around" time may still be desirable because of transients produced in the audio frequency amplifier by the change from frequency modulation in one direction to that in the other direction. Such transients normally are not as severe as switching transients but if the audio frequency amplifier has a fairly sharp cutoff at either the high frequency end or the low frequency end, they may cause some trouble unless counter blanking is employed.

Although the invention is particularly useful when applied to a pair of switched counters which are differentially connected to give a speed indication, the feature of blanking a counter during the interval of change from increasing frequency to decreasing frequency or vice versa, i. e., during the "turn-around" period, may be employed advantageously in altimeters employing only one frequency counter, for example. By such blanking it is possible to avoid errors due to the tendency of the counter to miss counts during the "turn-around" period because of their low frequency and their resulting attenuation where the audio frequency amplifier is designed with the usual low frequency cutoff. At the same time, no new difficulty is introduced as would be the case if an attempt were made to blank an amplifier instead of the counter.

I claim as my invention:

1. In a radio control system including radio transmitter means and radio receiver means whereby signals are radiated to and received from a reflecting object, said control system including a pair of directive antennas having angularly displaced directive radiation patterns, means for frequency modulating said transmitter by a triangular wave and switching means for cyclically changing the directive response of said antenna system from one to the other of two alternate overlapping directive patterns whereby switching transients are unavoidably produced, means for comparing the amplitude of the output of said receiver means during periods of operation with one of said directive patterns with the amplitude of the output of said receiver means during periods of operation with the other of said directive patterns, means for supplying the output of said amplitude comparison circuit to a utilization circuit, a pair of frequency counters having a common storage capacitor, one of said counters being a negative counter and the other being a positive counter whereby the voltage across said capacitor is a measure of the difference in the outputs of said counters, and means for making one of the counters active only during the upsweep of said triangular wave and for making the other counter active only during the downsweep of said triangular wave and for making both of said counters inactive during the presence of said switching transients.

2. In a radio control system, a radio transmitter, means for cyclically frequency modulating said transmitter to produce a signal that cyclically increases and decreases in frequency, means for radiating said modulated signal, means for receiving said signal after reflection from a target or other object, said receiving means including a detector, means for mixing in said detector said reflected signal with signal obtained directly from said transmitter to produce a beat frequency signal, said system including a pair of directive antennas having angularly displaced directive radiation patterns, switching means for alternately connecting said antennas to said system in synchronism with said cyclic frequency modulation, said switching means producing undesirable switching transients, a pair of frequency counters having a common storage capacitor and which are connected to supply charging currents in polarity opposition to said common storage capacitor, means for supplying the output of said detector to said counters, means for making one of the counters active only during the increase in frequency of said modulated signal and for making the other counter active only during the decrease in frequency of said modulated signal and for making both of said counters inactive during the presence of said switching transients.

3. In a radio control system, a radio transmitter, means for cyclically frequency modulating said transmitter to produce a signal that cyclically increases and decreases in frequency, means for radiating said modulated signal, means for receiving said signal after reflection from a target or other object, said receiving means including a detector, means for mixing in said detector said reflected signal with signal obtained directly from said transmitter to produce a beat frequency signal, said system including a pair of directive antennas having angularly displaced directive radiation patterns, switching means for alternately connecting said antennas to said system in synchronism with said cyclic frequency modulation, said switching means producing undesirable switching transients, means for comparing the amplitude of the output of said detector during periods of operation with one of said directive patterns with the amplitude of the output of said detector during periods of operation with the other of said directive patterns, means for supplying the output of said amplitude comparison circuit to a utilization circuit, a pair of frequency counters which have a common storage capacitor and which are connected to supply charging currents in polarity opposition to said common storage capacitor, means for supplying the output of said detector to said counters, means for making one of the counters active only during the increase in frequency of said modulated signal and for making the other counter active only during the decrease in frequency of said modulated signal, and means for making both of said counters inactive during the presence of said switching transients.

4. In a radio control system, a radio transmitter, means for producing a square voltage wave, means for producing a triangular voltage wave from said square wave, means for cyclically frequency modulating said transmitter by said triangular wave to produce a signal that cyclically increases and decreases in frequency, means for radiating said modulated signal, means for receiving said signal after reflection from an object, said receiving means including a detector, means for mixing in said detector said reflected signal with signal obtained directly from said transmitter to produce a beat frequency signal, said system including a pair of directive antennas having angularly displaced directive radiation patterns, switching means for alternately connecting said antennas to said system in synchronism with said cyclic frequency modulation, said switching means producing undesirable switching transients, a pair of frequency counters having a common storage capacitor and which are connected to supply charging currents in polarity opposition to said common storage capacitor, means for supplying the output of said detector to said counters, means for making one of the counters active only during the increase in frequency of said modulated signal and for making the other counter active only during the decrease in frequency of said modulated signal and for making both of said counters inactive during the presence of said switching transients, said last means comprising wave shaping means for producing from said square wave a counter switching wave having positive and negative periods with blanking periods therebetween and means for applying said switching wave to said counters.

5. In a radio control system, a radio transmitter, means for cyclically and linearly frequency modulating said transmitter to produce a signal that cyclically increases linearly in frequency, means for radiating said modulated signal, means for receiving said signal after reflection from a target or other object, said receiving means including a detector, means for mixing in said detector said reflected signal with signal obtained directly from said transmitter to produce a beat frequency signal, said system including a pair of directive antennas having angularly displaced directive radiation patterns, switching means for connecting said antennas alternately to said system in synchronism with said cyclic frequency modulation, said switching means producing undesirable switching transients, means for comparing the amplitude of the output of said detector during periods of operation with one of said directive patterns with the amplitude of the output of said detector during periods of operation with the other of said directive patterns, means for supplying the output of said amplitude comparison circuit to a utilization circuit, a pair of frequency counters which have a common storage capacitor and which are connected to supply charging currents in polarity opposition to said common storage capacitor, each counter including a pair of vacuum tubes each having a control grid, means for supplying the output of said detector to said counters, means for making one of the counters active only during the increase in frequency of said modulated signal and for making the other counter active only during the decrease in frequency of said modulated signal, said last-mentioned means including means for supplying a rectangular voltage wave to the grid of a tube in each of said counters, and means for making both of said counters inactive during the presence of said switching transients, said last means including means for producing blanking pulses and means for applying said blanking pulses to the grids of the other vacuum tubes in said counters.

BEN R. COLE.

REFERENCES CITED

The following references are of record in the file of this patent:

UNITED STATES PATENTS

| Number | Name | Date |
|---|---|---|
| 2,206,637 | Koch | July 2, 1940 |
| 2,206,896 | Higgins | July 9, 1940 |
| 2,232,858 | Lane | Feb. 25, 1941 |
| 2,412,632 | Sanders | Dec. 17, 1946 |